United States Patent [19]

Samsioe

[11] 4,179,648
[45] Dec. 18, 1979

[54] METHOD AND APPARATUS FOR RAPID BATTERY CHARGING

[76] Inventor: Per-Edward Samsioe, Edsviksvagen 138, 191 43 Sollentuna, Sweden

[21] Appl. No.: 851,820

[22] Filed: Nov. 16, 1977

[30] Foreign Application Priority Data

Jan. 24, 1977 [SE] Sweden .............................. 7700703

[51] Int. Cl.² .............................................. H02J 7/04
[52] U.S. Cl. ....................................... 320/11; 320/23; 320/39
[58] Field of Search .............................. 320/20, 22–24, 320/30, 37, 38, 39, 40, 5, 11

[56] References Cited
U.S. PATENT DOCUMENTS 3,603,861  9/1971  Staats et al. ........................ 320/38 X
4,052,656  10/1977  Lavell et al. .......................... 320/23

Primary Examiner—Robert J. Hickey
Attorney, Agent, or Firm—Silverman, Cass & Singer, Ltd.

[57] ABSTRACT

A method and apparatus for charging electrical storage batteries having a known nominal amperage. Discharging the battery to a predetermined value and then charging the battery with a charging current which is initially several times greater than the nominal battery amperage and which charging current decreases exponentially from the initial charging current to a charging current which is much less than the nominal battery amperage when the battery is fully charged. The apparatus uses the discharge rate of an RC circuit to exponentially control the charging current applied to the battery.

11 Claims, 3 Drawing Figures

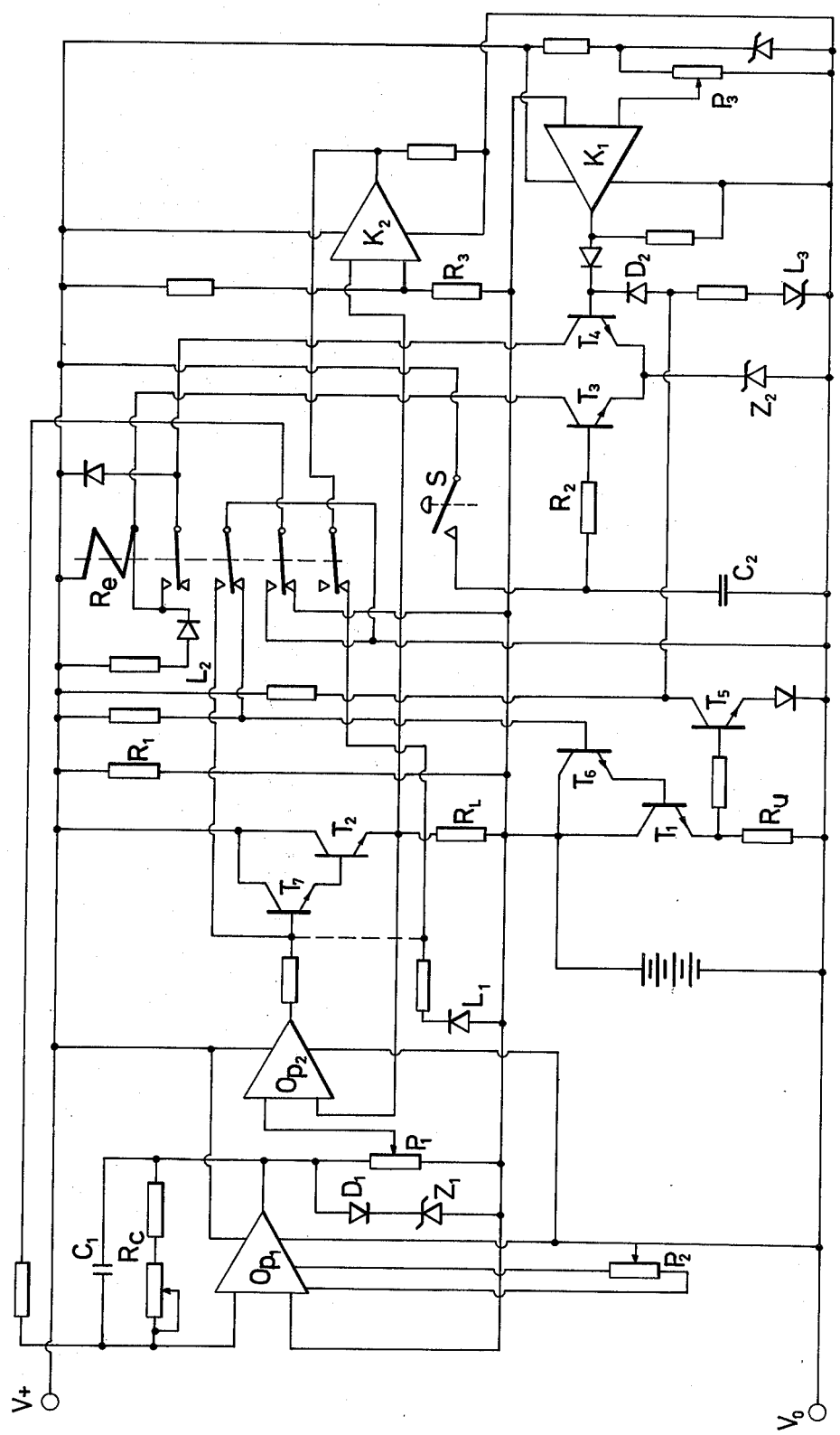

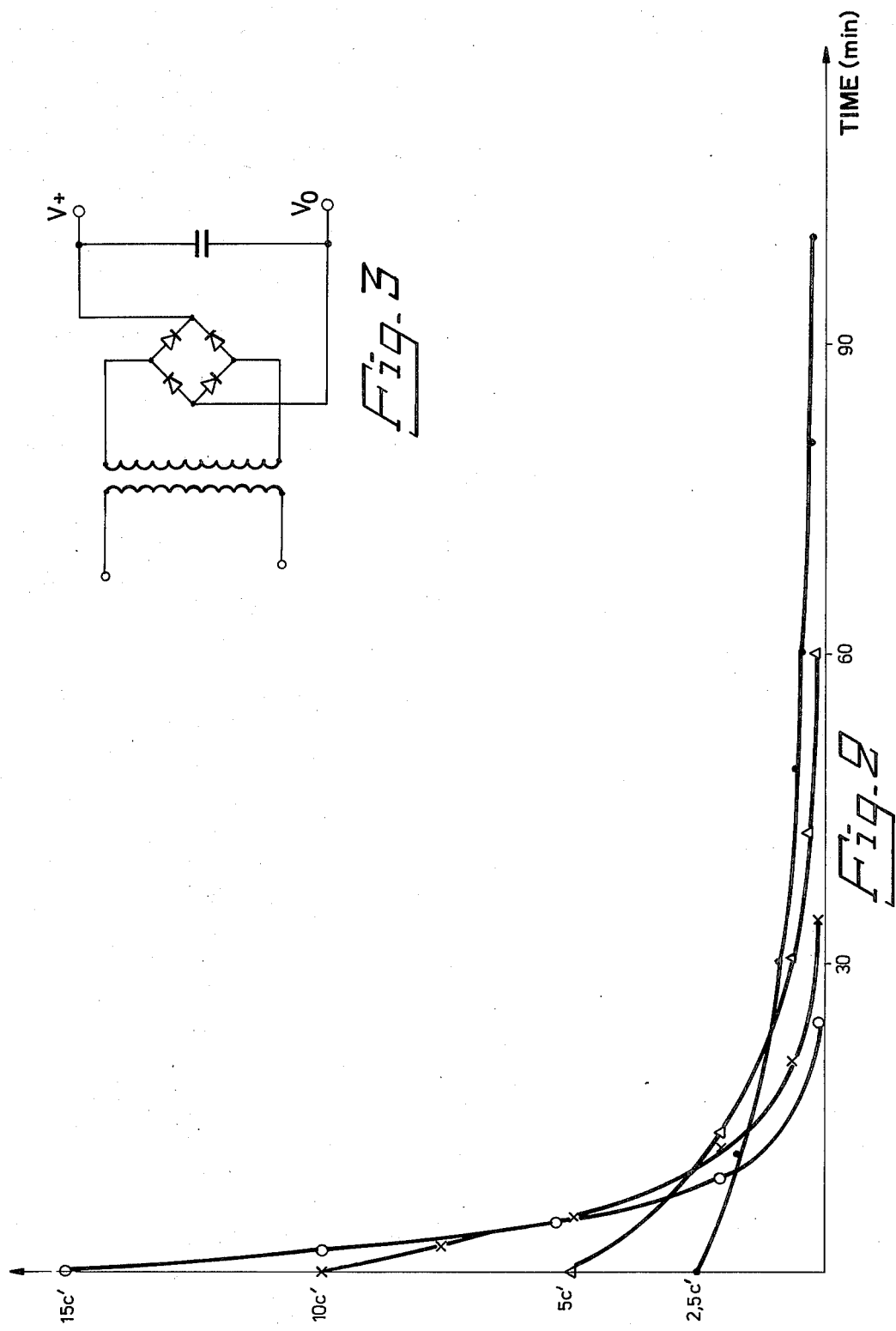

METHOD AND APPARATUS FOR RAPID BATTERY CHARGING

Battery manufacturers generally recommend their batteries or accumulators be charged during a period of 16 hours with a current of one tenth of the nominal accumulator amperage. The low current is necessary to avoid damage of the accumulator by overcharging. The long charging period is in most cases unsatisfactory.

A battery comprising a plurality of batteries accumulators connected in series, hereinafter called cells, can be charged rapidly with constant current to about 80 percent of its capacity, in a period shorter than one hour, if the high charging current required therefor then is disconnected, so that the battery is not damaged by temperature increase and gas development. A more efficient rapid charging method from a capacity point of view is the so-called pulse charging, at which the battery is subjected to high current pulses interrupted by rest intervals. In certain embodiments the pulses are combined with short discharging pulses. The pulse length is determined by the battery voltage, in such a manner, that with rising voltage of the battery being charged the charging pulse is shortened.

At other rapid charge methods, increase in voltage, temperature or pressure is utilized for reducing the current to a harmless level at the end of the charging operation.

All of said methods, with the exception of constant current charging, use parameters depending on the behavior of the battery or of a cell during the charging operation. These battery parameters generally are not sufficiently safe factors. The battery voltage depends on the temperature and the age of the battery. The voltage, besides, often differs from one cell to another, even when the manufacturing data of the cells are the same. A cell comprised in a battery generally is provided with attached temperature sensing elements. Such an element responds to the ambient temperature and indicates only the temperature in the cell being measured. For sensing the pressure in a battery, an incision in the battery must be made. In a battery to be charged according to the above methods, therefore, the cells selected generally must have properties as uniform as possible.

The present invention renders its possible to rapidly charge a cell or a battery without the charging current depending on some of the battery parameters. This is possible, because at the starting of the charging operation the current is given a value, which is several times higher than the amperage of the battery and then drops exponentially, so that at the fully charged battery the current is sufficiently low for not damaging the battery. In order to ensure, that the battery at the starting of the charging operation is entirely discharged, the apparatus is provided with an electronic circuit, which upon coupling of the battery to the apparatus first discharges a possible residual capacity and thereafter automatically starts the charging operation. The method according to the invention and the apparatus for carrying out the method are defined in the attached claims.

The apparatus in an advantageous embodiment comprises a plurality of potentiometers, so that the charging curve can be varied within wide limits to be adaptive to different battery types. The apparatus preferably is provided with an electronic circuit, which interrupts the charging or ignites a luminous diode when the current has dropped to a predetermined value. The idea of the invention, its method and the structure of the apparatus are described in greater detail in the following, with reference to an embodiment illustrated in the accompanying drawings, in which FIG. 1 is a wiring diagram for a charging apparatus according to the invention, FIG. 2 shows four alternative charging curves, and FIG. 3 shows a suitable power source for the apparatus.

In FIG. 1 the structure of the charging apparatus is shown by its main features. Upon coupling the battery to the apparatus, a low charging current flows to the battery through the resistance $R_1$. This resistance has been chosen so that the current flowing therethrough corresponds to the 16-hour current for the battery in question. The reason of this is to enable, when desired, charging of the battery according to the manufacturer's recommendations. When the contact S is closed for a short moment, the capacitor $C_2$ is charged to the main voltage $V+$. The base on the transistor $T_3$ thereby receives voltage and starts conducting, so that the relay $R_3$ is energized. $T_3$ remains conductive until $C_2$ has been discharged to a voltage determined by the Zener diode $Z_2$. The capacitor $C_2$ and the resistance $R_2$ have been chosen so that $T_3$ safely remains conductive until the control circuit $C_1R_c$ has been charged to its full value. The comparator $K_1$ compares the voltage of the battery or parts thereof with an adjustable voltage on the potentiometer $P_3$. As long as the battery voltage exceeds the value set on $P_3$, $K_1$ emits such an output signal that the transistor $T_4$ is conducting. $T_4$ is coupled to the relay $R_e$ via one of the relay contacts. In this way, the relay after having become operative remains energized until the battery has been discharged to the value preset on $P_3$. The voltage on $P_3$ is chosen so that the battery is discharged entirely without pole change of any cell during the discharge. As long as $R_e$ is energized, the battery is discharged via the transistor $T_1$ and resistance $R_u$. $R_u$ preferably is chosen so that possible residual capacity is discharged within a couple of minutes. Upon release of the relay $R_e$, the base on the transistor $T_6$ is coupled to $V_o$. Thereby $T_6$ and $T_1$ are cut-off, so that the discharge is stopped. The charging can now start thereby that the coupling of the transistor $T_7$ to $V_o$ is interrupted, so that the output signal from the operation amplifier $Op_2$ is coupled to the transistor $T_2$ via $T_7$. The capacitor $C_1$, which during the discharging period has been charged to a voltage determined by the Zener diode $Z_1$ and diode $D_1$, starts discharging through the variable resistance $R_c$ when the battery charging starts. The capacitor voltage, by help of the operation amplifier $Op_1$ and the potentiometer $P_1$, determines the voltage at one input to the operation amplifier $Op_2$. $Op_2$ compares the voltage over $P_1$ with the voltage over the resistance $R_L$ and controls the transistor $T_2$ so that there is equal voltage over $P_1$ and $R_L$. The charging current flowing through $T_2$ and $R_L$ thereby drops at the same rate as the voltage over $C_1$. The voltage to one input on $Op_2$ is coupled to the variable point on $P_1$. Thereby, the starting value of the charging current can be set. The current at the end of the charging can be set thereby that the voltage on $P_1$, when the capacitor is discharged entirely, is depending on the offset voltage of the operation amplifier which can be varied with the potentiometer $P_2$.

The object of the comparator $K_2$ is to compare the voltage over the resistance $R_L$ with the voltage over $R_3$. When the voltage over $R_L$ has dropped, i.e. when the current has fallen to the limit determined by $R_3$, $K_2$ emits such an output signal that the luminous diode $L_1$ is lighted. This indicates completion of the charging. In the Figure is indicated that the output on $K_2$ alternatively can be coupled to the base on the transistor $T_7$, by which coupling the charging current is interrupted at the value determined by $R_L$ and $R_3$.

The object of the transistor $T_5$ is to prevent the starting of the charging when the battery is very poor or short-circuited. This is effected thereby that a low voltage over $R_u$, i.e. at low or no discharging current, $T_5$ is cut-off so that the base on $T_4$ receives voltage and remains conductive even when the battery voltage is lower than the voltage on $P_3$. As long as $T_4$ is conductive, the relay remains in pulled state and, thus, the charging cannot start. The lumious diode $L_3$ lights when $T_5$ is cut-off, which implies that $L_3$ after actuation of $R_e$ will light together with $L_2$ when the battery is in poor condition. $L_3$ also lights when charging is going on. The lumious diode $L_2$ lights when the relay is energized, i.e. during the discharging operation.

The charging current is controlled by a capacitor $C_1$, which is discharged over a resistance $R_c$. This implies that the charging current is caused to drop along the discharge curve of a capacitor. The current, therefore, can be expressed according to the formula $$I = I_o e^{-\frac{t}{RC}}$$

and the capacity charged by $$\int_o^t i\, dt = I_o RC (1 - e^{-\frac{t}{RC}})$$

A term is to be added if the current would not have been chosen to be O when the capacitor is discharged. In the formula, t designates the time, counted from the beginning of the charging $I_o$ designates the starting current at the time O, I designates the current at the time t, and RC designates the time constant for the control circuit. When in the above formulae the nominal amperage of a battery is called $C^1$, and when it is taken into consideration that the charging is not efficient to one hundred percent, so that the charging factor 1, 2 is introduced the Table below can be calculated. The charging current in the Table has been expressed as the numerical value for the nominal amperage of the battery.

| RC = 289.9 | 436.4 | 881.6 | 1800.0 |
|---|---|---|---|
| $I_o$ = 15.0 $C^1$ | 10.0 $C^1$ | 5.0 $C^1$ | 2.5 $C^1$ |
| $I_5$ = 5.3 $C^1$ | 5.0 $C^1$ | 3.6 $C^1$ | 2.1 $C^1$ |
| $I_{20}$ = 0.24 $C^1$ | 0.64 $C^1$ | 1.28 $C^1$ | 1.28 $C^1$ |
| $I_{30}$ = | 0.16 $C^1$ | 0.64 $C^1$ | 0.42 $C^1$ |
| $I_{60}$ = | | 0.08 $C^1$ | 0.34 $C^1$ |
| $I_{100}$ = | | | 0.04 $C^1$ |

The capacity $C^1$ theoretically has been charged to the battery after 8.5 min, 12.7 min, 24.4 min and 48.3 min, respectively. The current has dropped to $C^1/10$, which is a normal 16-hours current, after 24.2 min, 33.5 min, 57.5 min and 96.6 min, respectively. FIG. 2 shows the charging curves calculated above and the curves, which can be achieved with the present invention. All curves correspond to the same charged amperage. Tests have shown that the calculated values well agree with the values obtained during the charging of a battery according to the present method. It is to be pointed out that batteries of different types, sizes and makes have different capacities of receiving high current during the charging operation. The apparatus, therefore, has been designed so that for every battery type the maximum charging speed can be found. The high charging current is very favorable for batteries, which at increasing age show the tendency of developing short-circuit bridges caused by dendrite formation. Such bridges, as known, can be broken down by high current pulses, which restore the serviceability of the battery. Tests have proved that the apparatus according to the invention has such an effect. The test battery was charged during 20 minutes and then was discharged normally, whereafter a new charging was started. The measured life substantially exceeded the life obtained with recommended 16-hours charging, for the same battery type and make. The test, besides, proved that by this method the battery was charged to hundred percent.

FIG. 3 is a wiring diagram for transforming an alternating current source to the voltage taps necessary for charging the battery. The voltage source must meet the requirement that its voltage exceeds by some volts the voltage of the battery to be charged, and that it holds at least the capacity required by the battery during the charging. This implies that, for example, also a large battery can be used as voltage source.

The wiring shown in FIG. 3 can be completed by a suitable known device, for example an integrated circuit, for obtaining a constant voltage of a desired level.

The idea of the invention, thus, implies that a battery, after having been entirely discharged, is charged with a current, which at the beginning of the charging has a value exceeding several times the nominal amperage of the battery, whereafter the current is caused to drop exponentially with the time along a curve, which is upwardly concave and determined by the discharge of a capacitor. The invention further implies that the charging operation can be controlled so that the current at the end of the charging operation either is so low that the battery is not damaged by overcharging, or so that the current is interrupted at a predetermined higher value whereafter the charging automatically continues with a sufficiently low current.

The voltage supplied to the apparatus according to FIG. 1 can be chosen up to about 30 V, but higher than the voltage to which the battery is to be charged. An adjustment of the apparatus according to the invention to a selected supply voltage preferably can be made by chosing in known manner a suitable relay ($R_e$) and suitable Zener diodes.

At voltages above 30 V, also other components must be adjusted, or the voltage must be controlled at the input (V+, $V_o$) of the apparatus.

For the charging of batteries, the input of the apparatus can also suitably be connected to car batteries. A special application of this kind is the charging of batteries for military equipment, by using motor vehicle batteries as voltage source. The apparatus is suitable for this purpose, because it is easily adjustable to different battery types, permits rapid charging and can be designed compact and sturdy.

The apparatus according to the invention is not to be regarded restricted to the embodiments described above, but can be varied within the scope of the attached claims.

I claim:

1. A method of rapidly charging a battery having a known nominal amperage, comprising:
  discharging the battery to a predetermined value to discharge a possible residual charge on the battery, and
  automatically charging the battery with a charging current having a value which initially is greater than the value of the nominal battery amperage, decreasing said charging current from its initial value at an exponential rate determined by a resistor-capacitor discharge circuit, and decreasing said charging current to a value sufficiently less than the nominal battery amperage to prevent damage to the battery.

2. A method of charging a battery as claimed in claim 1 including decreasing said charging current to a predetermined value, interrupting said charging current and replacing said charging current with a constant current sufficiently less than the battery nominal amperage to prevent damage to the battery.

3. A method of charging a battery as claimed in claim 1, including adjusting said discharge rate so that an integral of the exponential rate of the charging current substantially equals the nominal amperage of the battery being charged.

4. A method of charging a battery as claimed in claim 1, including fully charging said resistor-capacitor circuit before charging said battery.

5. An apparatus for charging a battery comprising,
  A. means for discharging the battery,
  B. circuit means coupled to the discharge means, for controlling the discharge of the battery to a predetermined voltage value,
  C. means for charging the battery with a charging current,
  D. operation circuit means for automatically switching the battery from the discharging means to the charging means at said predetermined discharge value, said means being coupled to said discharging means, said charging means and said battery, and
  E. control means coupled to the charging means for regulating the charging current supplied to the battery, said control means including a resistor-capacitor discharge circuit, said charging current having an initial value greater than the nominal battery amperage and regulated by said control means to decrease in an exponentially decreasing rate determined by the resistor-capacitor circuit to a final value less than the nominal battery amperage to prevent damage to the battery.

6. An apparatus as claimed in claim 5 in which said discharge control means include a first comparator having a first input coupled to said battery and a second input coupled to a first adjustable resistor, said adjustable resistor establishing said predetermined voltage value, said comparator generating a discharge signal on an output when said battery voltage is discharged to said predetermined voltage value,
  said operation circuit means include a coupling transistor coupled to said comparator output and to a switching relay, said transistor operating to cause said relay to switch said battery from said discharging means to said charging means when said discharge signal is generated on said comparator output,
  said charging control means resistor-capacitor circuit including a second adjustable resistor and a capacitor connected in parallel, said capacitor being charged to a second predetermined voltage value during the discharging of said battery and discharged through said resistor when said battery is switched to said charging means, said exponentially decreasing charging rate determined by a first operational amplifier having one input coupled through a second operational amplifier and a third adjustable resistor to the resistor-capacitor circuit, said third resistor establishing an adjustable input voltage to said first amplifier, a second input of said first amplifier coupled to a charging load resistor, said first amplifier having an output coupled to a charging control transistor, said transistor being coupled between said charging means and said load resistor to control said exponential charging rate at the rate of discharge of said resistor-capacitor circuit.

7. An apparatus as claimed in claim 6 in which said charging control means include a second comparator having a first input coupled to said charging load resistor, said load resistor establishing a charging voltage in response to said charging current passing through said load resistor, and a second input coupled to a fixed resistor, said fixed resistor establishing a third predetermined voltage value, said comparator generating a charging stop signal on an output when said charging voltage equals said third voltage value, and said comparator output being coupled to said charging control transistor to interrupt said charging current when said charging stop signal is generated.

8. An apparatus as claimed in claim 6 in which said charging control means include a second comparator having a first input coupled to said charging load resistor, said load resistor establishing a charging voltage in response to said charging current passing through said load resistor, and a second input coupled to a fixed resistor, said fixed resistor establishing a third predetermined voltage value, said comparator generating a charging stop signal on an output when said charging voltage equals said third voltage value, and said comparator output being coupled to a luminous diode to light said diode when said charging stop signal is generated.

9. An apparatus as claimed in claim 5 in which said resistor capacitor discharge circuit includes a capacitor coupled in parallel with a resistor, and said capacitor being coupled in series with a Zener diode and a diode to a voltage source to charge said capacitor to a second predetermined voltage value.

10. An apparatus as claimed in claim 6 in which said charging control means include a fourth adjustable resistor coupled to said second operational amplifier to actuate an offset output voltage of said amplifier and offset said final value of said charging current through said first operational amplifier and said charging control transistor.

11. An apparatus as claimed in claim 6 in which said discharging means include a discharge resistor coupled to said battery for discharging a current from said battery, said discharge resistor being coupled to said relay through a current sensing transistor and said coupling transistor, said sensing transistor operating to cause said relay to remain coupled to said discharging means when said battery discharging current through said discharge resistor is low which occurs in poor or short-circuited batteries.

* * * * *